April 1, 1947.    E. GORIN    2,418,402
MANUFACTURE OF OXYGEN
Filed Aug. 7, 1944
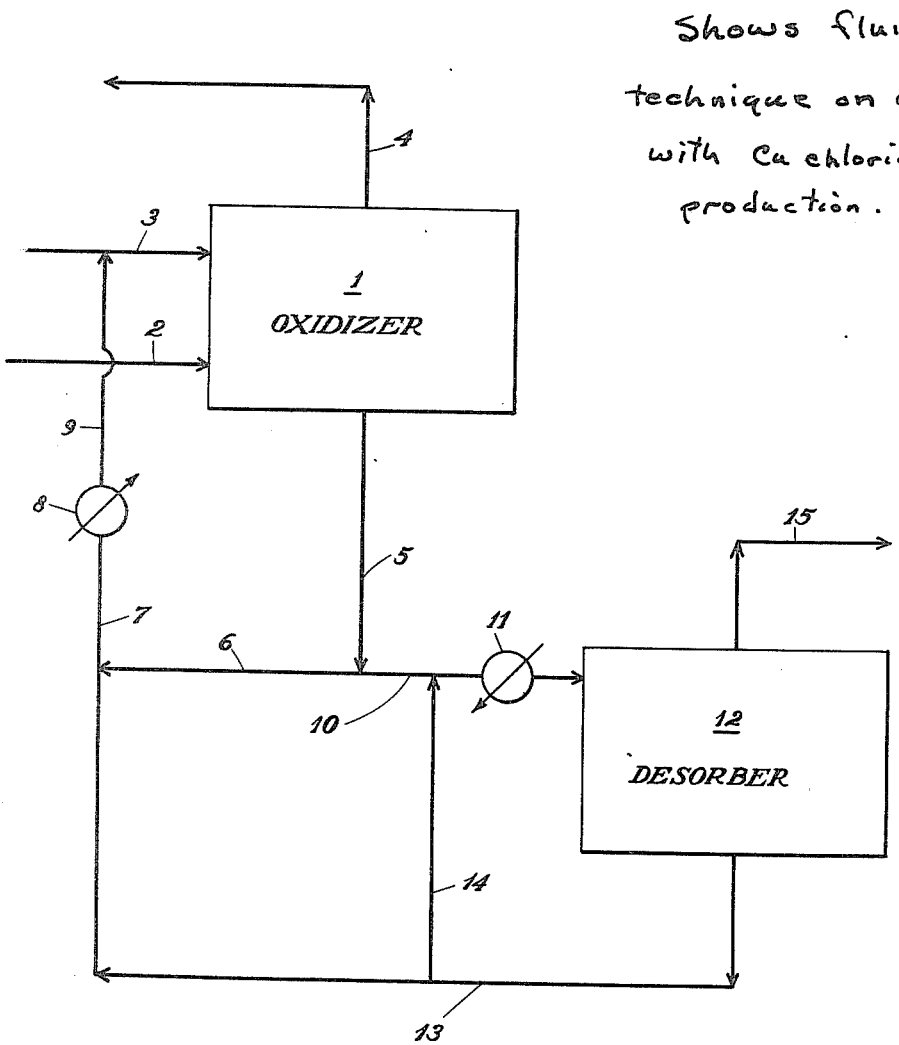
Everett Gorin
INVENTOR
BY Sidney A. Johnson
ATTORNEY Patented Apr. 1, 1947

2,418,402

UNITED STATES PATENT OFFICE 2,418,402

MANUFACTURE OF OXYGEN

Everett Gorin, Dallas, Tex., assignor, by mesne assignments, to Socony-Vacuum Oil Company, Incorporated, New York, N. Y., a corporation of New York Application August 7, 1944, Serial No. 548,352

11 Claims. (Cl. 23—221)

This invention relates to the production of oxygen and especially to the production of oxygen from air.

Oxygen as a reagent is assuming ever increasing importance in the fields of organic and petroleum chemistry. It is especially valuable as a reagent for numerous high temperature reactions of the light paraffin hydrocarbons. However, its use for this purpose has been restricted up to the present because of the high cost of preparing oxygen by fractionation of liquid air. A few of the interesting reactions which may be carried out with oxygen as a reagent are: the partial combustion of methane and other light hydrocarbons to form acetylene; the partial combustion of ethane and propane to form ethylene; the catalytic oxidation of methane to carbon monoxide and hydrogen; and the oxidation of light paraffins to aldehydes, ketones, alcohols and acids.

Numerous methods have been proposed in the prior art for the preparation of oxygen from air. These methods fall into two general categories, viz., those involving physical methods of separation, such as liquefaction followed by fractionation of the liquid air, and those involving chemical methods, such as absorption and desorption of oxygen by chemical oxidation and reduction reactions. The earliest method of manufacturing oxygen involved absorption from air by barium oxide, to form barium peroxide, followed by desorption of the oxygen at elevated temperatures. This method proved cumbersome in practice because of the high temperatures involved and the necessity of carefully purifying the air, and has been commercially abandoned in favor of the liquefaction method. However, the liquefaction method is intrinsically expensive, involving costly high pressure refrigeration equipment, and its replacement by some more economical procedure would be desirable.

It is therefore a primary object of the present invention to provide an improved and economical method of producing oxygen from the air. Another object is the provision of a continuous method of producing oxygen by absorption and desorption from salt melts, particularly cuprous chloride-alkali metal chloride melts. Still another object is the production of low pressure oxygen which may be utilized as a reagent for various chemical processes such as the oxidation or partial combustion of light paraffins.

These objects are accomplished by the present invention which essentially comprises a two stage process for the production of oxygen from air involving in one stage, absorption of oxygen from air by a copper chloride melt, and in the second stage, desorption of the oxygen from the partially oxidized melt, the said melt being continuously circulated through the said process stages.

I have described copper chloride melts as oxygen absorption media in my co-pending applications, Serial Nos. 507,616 and 507,617, filed October 25, 1943, wherein the use of these melts for the manufacture of chlorine is disclosed and claimed. Since the melting points of the copper chlorides are high, (cuprous chloride—422° C.; cupric chloride—above 600° C.) the copper chlorides are admixed with other metallic chloride melting point depressants such as lead chloride, zinc chloride, stannous chloride, silver chloride or the alkali metal chlorides, particularly potassium chloride, where the process is operated at a temperature below the melting point of the copper chloride salts per se. A preferred copper chloride melt containing an alkali metal chloride in an amount to give optimum oxidation rates is more fully described in copending C. M. Fontana application entitled Oxygen absorption media, Serial No. 548,349, filed August 7, 1944, wherein the melts are disclosed and claimed as novel compositions of matter. These melts comprise molten mixtures of cuprous chloride and cupric chloride preferably with an alkali metal chloride such as potassium chloride. A typical melt has a mole ratio of potassium chloride to cupric chloride of approximately two to one, cuprous chloride making up the remainder of the melt when made up on a one hundred mole basis. It has been found that on this basis the proportion of potassium chloride should be within the range of 20 moles and 50 moles of the total melt and preferably within the range of 25 and 45 mole percent in order to provide media of high utility relative to suitable freezing point and rate of oxygen absorption in processes involving an oxygen absorption step. The freezing point of a melt consisting of 30 mole percent potassium chloride, 15 mole percent cupric chloride and 55 mole percent cuprous chloride is about 255° C., that is, about 70° C. below the minimum operating temperature of any step in my process, and hence, such a melt is easily maintained as a transferable liquid in the process. Such a melt also possesses relatively high oxygen absorptive properties.

The reactions involved in the oxygen absorption step of my process may be represented by the following equations:

(1)  $2Cu_2Cl_2 + O_2 \longrightarrow 2CuO \cdot CuCl_2$ (2)  $2CuCl_2 + O_2 \longrightarrow 2CuO + 2CuCl_2$
                                    $\downarrow$ Equation 1 represents the nature of the reaction when I operate my process in such manner that the cupric oxide formed remains in solution while Equation 2 represents the nature of the process when solid cupric oxide is precipitated during the oxidation. Since the solubility of the cupric oxide in the molten mixture is relatively low, the conversion per pass must be low if it is desired to operate with the melt as a homogeneous liquid in both steps of the process. While it is possible to operate my process with low conversion per pass and high circulation rate, operation by this method is usually uneconomic and hence, less desirable.

The preferred method of operating the process is to absorb oxygen by the oxychloride saturated melt, that is, to convert a higher percent of the cuprous chloride to the oxychloride than will permit retention of the cupric oxide decomposition product thereof in solution. This method of operation results in the production of a relatively pure oxygen desorption product, containing no more than minor amounts of chlorine. The higher conversion of melt per pass through the oxygen absorption step makes the process more economical with respect to cost of circulating the absorbent. By this method of operation, undissolved excess cupric oxide is held as a highly dispersed suspension in the melt in the oxidation step of the process, and the conversion per pass is limited only by the amount of cupric oxide capable of being held in such suspended state. Obviously, if the melt is supported by an inert powdered solid, this limitation practically disappears. Upon encountering changed operating conditions relative to pressure or temperature or both in the desorption step, the suspended cupric oxide reacts with the intimately associated oxychloride solution of cupric chloride to form free oxygen and cuprous chloride according to Equation 3 below, although normally cupric oxide is stable up to much higher temperature, i. e., about 1100° C.

(3) $\qquad CuO + CuCl_2 \rightarrow Cu_2Cl_2 + \tfrac{1}{2}O_2$

Thus, the suspension of cupric oxide disappears in the desorption zone leaving a homogeneous melt consisting predominantly of cuprous chloride in admixture with potassium chloride and with cupric chloride and cupric oxychloride in minor amounts suitable for recycle to the oxygen absorption step.

The operation of my process will be more clearly understood by reference to the drawing which is a diagrammatic representation of the broad application of my invention. Referring to the drawing, air or other free oxygen containing gas is introduced to oxidizer 1 through line 2. The air may be preheated but usually hot recycle desorbed melt will furnish sufficient heat since the oxidation reaction in oxidizer 1 is exothermic.

In oxidizer 1, the air is contacted with hot melt introduced through line 3. The temperature maintained in oxidizer 1 will be within the range of about 325° C. to about 500° C. preferably from about 350° C. to about 400° C. The use of temperatures higher than about 425 C. in the absorber is made possible by operating the absorber at relatively high pressure, twenty atmospheres or higher, and/or by operating with relatively low concentration of cupric chloride in the absorbent at more moderate pressures of say five to twenty atmospheres. The choice of operating temperature of oxidizer 1 is governed by the rate of absorption desired and by the partial pressure of oxygen in the reactor. The choice of operating temperature within the above limits will also be affected by the composition of the melt. A suitable reactant melt may contain from about 20 mole percent to about 50 mole percent of potassium chloride and a net cupric chloride concentration, defined below, within the range of 10 mole percent to about 30 mole percent of the total melt, the remaining reactant material consisting of cuprous chloride. The net cupric chloride concentration is defined as the total cupric concentration minus twice the total oxide content. It is thus seen that the net cupric concentration does not change as the melt is passed through the oxidizer. The net cupric concentration may also be defined in terms of mole percent of total copper in which case it may be expressed by the equation $$\text{Net Cu}^{++}(\% \text{ of total Cu}) = \frac{\text{Net Cu}^{++}(\% \text{ of total melt})}{1 - \text{mole } \% \text{ KCl}/100}$$

The melt composition in passing through the steps of the process may vary over a wide range and may be expressed in the change of total cuprous concentration in relation to total copper. The change in cuprous concentration may, for example, vary between limits of from about 6% to about 40% of the total copper present in the melt.

The pressure in oxidizer 1 may vary from one atmosphere to twenty atmospheres or even higher. Pressures above atmospheric, say five or ten atmospheres, are preferable to lower pressures since oxygen is absorbed from the free oxygen containing gas at much higher rates if the gas is under pressure. In any case, the partial pressure of oxygen above the melt in the absorption step must be higher than the partial pressure of oxygen in the desorption step described hereinbelow unless increased desorbent temperatures are used.

In oxidizer 1 oxygen is absorbed from the air and the oxygen depleted air stream passes from the system via line 4. The melt is converted to a non-homogeneous mass which contains in addition to the dissolved complex, $CuO \cdot CuCl_2$, suspended solid cupric oxide. The cupric chloride content of the melt will also be increased by an amount equivalent to the amount of cupric oxide produced.

Since the conversion per pass in oxidizer 1 may be as much as 40% of the total copper of the melt, cupric oxide will normally be precipitated and the temperature in the reactor will tend to increase. Some idea of the extent of temperature increase may be obtained by reference to Table I below wherein the temperature increase of the melt is shown as a function of the change in cupric oxide content for a melt containing 30 mole percent of potassium chloride.

*Table I*

| ΔCuO | Δt° C. |
|---|---|
| 3.0 | 17.9 |
| 4.0 | 23.8 |
| 5.0 | 29.8 |
| 6.0 | 36.0 |
| 8.0 | 47.6 |
| 10.0 | 59.6 |
| 15.0 | 89.2 |

The temperature rise is a measure of the increase in temperature of the melt leaving the oxidizer over that entering the oxidizer if no heat is added or subtracted from the melt during the oxidation. The above figures apply only to the case where the air is preheated to average reaction temperature before entering the oxidizer. If the air is not preheated, the temperature increase is considerably less and amounts to about 60 percent of the figures given above in Table I when the absorption is carried out at 400° C. It is to be noted that for each percent increase in cupric oxide content of the reactant mixture the temperature increases approximately 6° C. Hence, a part of the reacting mixture in oxidizer 1 may be withdrawn via line 5 for transfer through lines 6 and 7 and cooler 8 whence it is returned to oxidizer 1 via lines 9 and 3, if it is desired to prevent or control the amounts of temperature rise in oxidizer 1. On the other hand, it may be desirable to utilize cool air feed to oxidizer 1 and cool only recycle desorbed melt from desorber 12 described below.

The oxidized mixture is passed through line 5 to line 10 and through heater 11 wherein the temperature is preferably raised to the range of about 425° C. to about 550° C. Ordinarily I prefer to operate the desorber at a temperature level higher than that which prevails in the oxidizer. This requires that an amount of heat at least equal to the heat of desorption be added to the melt in desorber 12. On the other hand, by maintaining a condition of heat exchange between the melt in the absorber and the desorber such that the melt temperature in the desorber is only slightly lower than the temperature in the absorber, the amount of heat added to the melt in the desorber may be reduced or eliminated entirely provided the partial pressure of oxygen in the absorber is considerably greater than the oxygen pressure in the desorber. Heat exchange between the absorber and desorber may be effected either by rapid circulation of the melt between the absorber and the desorber or by indirect heat exchange where the melt from the absorber and desorber are circulated through an appropriate common heat exchanger.

The particular temperature required to desorb oxygen from oxidized copper chloride melts is a function of the amount of cupric oxide, and dissolved cupric chloride present in such melts. It is generally desirable to operate the desorption process in desorber 12 so that either solid cupric oxide or an appreciable amount of dissolved cupric oxychloride is always present in contact with the melt. Thus, the desorbed melt removed from desorber 12 via line 13 for recycle should always have an appreciable oxygen content corresponding to one to eight moles of cupric oxide per one hundred moles of copper present. When solid copper oxide is present, the temperature required to desorb oxygen is lower the higher the cupric chloride content of the melt, the content of other salts such as potassium chloride being maintained constant.

Where potassium chloride is present, the temperature required to desorb oxygen is lower the higher the potassium chloride content when the ratio of the number of moles of cupric chloride to the number of moles of potassium chloride is held constant. The amount of cupric chloride initially present should be between about 0.25 to 1.5 moles per mole of potassium chloride. The preferred range varies with the potassium chloride content of the melt and lies, for example, between about 0.5 to 1.0 mole of cupric chloride per mole of potassium chloride when 30 mole percent potassium chloride melts are employed.

I have found that higher temperatures of desorption produce a high purity oxygen product with respect to contamination with chlorine. In Table II below, I have shown some typical oxygen pressures for different temperatures over oxide saturated melts containing 30 mole percent potassium chloride. Chlorine pressures and oxygenchlorine ratios are also shown for melts of various composition with respect to chlorides of copper and copper oxide.

Table II

| Temp. °C. | Per cent $Cu^+$ | Per cent Net $Cu^{++}$ | Per cent CuO | mm. $pO_2$ | mm. $pCl_2$ | $\frac{pO_2}{pCl_2}$ |
|---|---|---|---|---|---|---|
| 400 | 41.4 | 45.8 | 6.4 | 160 | 2.6 | 61. |
| 425 | 55.0 | 37.0 | 4.0 | 145 | 2.0 | 72. |
| 425 | 37.8 | 50.0 | 6.1 | 780 | 8.0 | 97. |
| 450 | 50.7 | 51.3 | 4.0 | 760 | 6.2 | 123. |
| 475 | 64.8 | 35.0 | 2.6 | 800 | 5.0 | 160. |
| 500 | 70.2 | 27.0 | 1.4 | 760 | 4.3 | 177. |

It is to be noted that at temperatures of 450° C and higher the ratio of pressure of oxygen to pressure of chlorine becomes large. Hence, operation of desorber 12 in the upper temperature range from about 450° C. to about 525° C. is preferable and heater 11 is provided to maintain higher temperatures in desorber 12 by recycling melt via lines 13 and 14, heater 11 and line 11 to furnish heat of desorption and also to raise the temperature of the mixture to the higher range.

The pressure maintained in the desorption zone 12 should be within the range of from about 0.5 atmosphere to about six atmospheres absolute. I have found that superamspheric pressure improves the oxygen-chlorine ratio in the product. Preferred pressures are one to four atmospheres (absolute scale). The maximum pressure at which oxygen may be desorbed from the melt is a function of the temperature of the melt in the absorber and desorber and the partial pressure of the oxygen in the absorber. I have found that the maximum permissible pressure in the desorber may be expressed in the form of the following inequality.

$$p_1 < p_2 10^{-9540\left(\frac{T_2-T_1}{T_1 T_2}\right)}$$

where $p_2$ is the partial pressure of oxygen in the air sent to the absorber, $p_1$ is the oxygen pressure in the desorber and $T_1$ and $T_2$ are the temperatures in degrees Kelvin in the desorber and absorber respectively. In case temperature gradients are present in the absorber and desorber, $T_1$ and $T_2$ refer to the minimum and maximum temperatures in the desorber and absorber respectively. As the above inequality approaches equality absolute non-desorbability is approached. The exact permissible value of $p_1$ will depend on the percent absorption of oxygen taken up in the absorber and on the rate of circulation of the melt, and therefore the value obtained by equating the above inequality should preferably be multiplied by a factor less than 1. I have found that factors within the range of from 0.16 to 0.6 should be used for the value of K in the equation below in order to determine permissible oxygen pressures in desorber 12 for operation of my process.

$$p_1 = Kp_2 10^{-9540\left(\frac{T_2-T_1}{T_1 T_2}\right)}$$

Thus, if absorption zone 1 is operated at a maximum temperature of 450° C. within said zone and at an air pressure of five atmospheres absolute and the minimum temperature maintained in desorber 12 is 475° C., oxygen desorption pres sures will lie within the range of about 0.4 and 1.8 atmospheres absolute. If on the other hand, a maximum temperature of 425° C. is maintained in the absorber under only two atmospheres absolute pressure of air, i. e., approximately 0.4 atmosphere of oxygen, and desorption is accomplished at 500° C. minimum temperature, desorption will be preferably within the range of from about 1.3 atmospheres and 5.6 atmospheres absolute pressure.

As the oxidized mixture is desorbed, oxygen is removed from desorber 12 through line 15 and the desorbed mixture is recycled via lines 13 and 7 to cooler 8 for cooling and ultimate recycle to oxidizer 1 via lines 9 and 3.

As indicated hereinabove, I may operate my process by utilizing the molten mixture of chlorides as a liquid mass to absorb oxygen, the cupric oxide product being suspended as a slurry in the steps of the process or preferably I may impregnate finely divided porous solids with the chlorides and use the impregnated powders as absorption media as described in my co-pending joint application with C. M. Fontana entitled Manufacture of oxygen, Serial No. 548,350, filed August 7, 1944. Inert natural clay carrier such as attapulgus clay or synthetic gels such as alumina or silica gel are impregnated with mixtures of copper chlorides and an alkali metal chloride such as potassium chloride. The dried impregnated carrier is crushed to small particle size, preferably powder size. The amount of chlorides impregnated in the carrier may be as much as 65% by weight without destroying the dry powder flow characteristics at the temperatures of operation of the steps of the process, that is at temperatures as high as 550° C. The heated impregnated powder is suspended by a free oxygen containing gas stream such as air. The oxygen of the gas stream is absorbed by the impregnated powder and the oxygen enriched finely divided material is transferred to a desorption zone where it is desorbed of oxygen at a higher temperature and/or lower pressure than the temperature and pressure prevailing in the oxidation or absorption zone. The desorbed powder is recycled to the oxygen absorption zone thus completing the cycle of absorption and desorption operations. Transfer of the powdered material between reaction zones and to and from coolers and heaters is made while in suspension in gas streams.

Although the above method of utilizing my oxygen absorbent chloride melts is preferred, I may also impregnate relatively large particles of inert carrier with the mixture of chlorides and operate the process according to any of the so-called moving bed techniques well known to the art. In this type of operation movement of the reactant mass through the reaction zones is by gravity flow and transfer of the recycle desorbed reactant mass from the desorption zone outlet to the oxygen absorption zone inlet may be made by bucket elevators or any other means well known to the art.

My process of using alkali metal chlorides in admixture with copper chlorides for extracting oxygen from the air has certain basic advantages over other processes which have utilized copper chlorides without the incorporation of another salt component to lower the freezing point of the copper chlorides. By maintaining the chlorides in the liquid state in the steps of the process, I obtain higher rates of oxidation in the absorption step and also higher rates of desorption in the desorption step. I have also found that the incorporation of potassium chloride with the copper chlorides provides melts which upon oxidation require lower temperatures for recovering the oxygen by desorption from such oxidized melts.

My process also has the advantage of furnishing a method for the continuous production of oxygen substantially free of diluent impurities. As pointed out hereinabove, operation with an excess of cupric oxide always present in the desorption zone results in very low chlorine contaminant in the oxygen product stream. The melts either in the form of a liquid mass or in the form of inert carrier supported liquid reactants furnish an efficient means for collecting and transferring oxygen and heat from the absorption zone to the desorption zone.

In describing my invention no detailed description of a specific method of carrying out the process has been given. The hereinabove mentioned co-pending joint application with C. M. Fontana, Serial No. 548,350, describes the preferred specific process in detail.

Obviously many modifications and variations of the invention as hereinabove set forth may be made without departing from the spirit and scope thereof and therefore, only such limitations should be imposed as are indicated by the appended claims.

I claim:

1. The process for the production of oxygen which comprises, (1) continuously contacting a circulating melt in contact with a free oxygen containing gas at a temperature within the range of from 325° to 500° C., said melt consisting of from 55 mole percent to 75 mole percent of copper chlorides, a major proportion of which copper chlorides is cuprous chloride and from 25 mole percent to 45 mole percent of at least one alkali metal chloride melting point depressant to maintain said copper chlorides in the liquid state at the temperature of contact with the gas, (2) continuously separating the oxidized melt from contact with the gas, (3) transferring in continuous flow the oxidized melt from said first reaction zone to a second reaction zone, (4) continuously subjecting the oxidized melt in said second reaction zone to a temperature of from about 425° C. to about 550° C. and to conditions of temperature and pressure such that the value of K is within the range of from 0.16 to 0.67 in the relationship $$p_1 = K p_2 10^{-9540\left(\frac{T_2-T_1}{T_1 T_2}\right)}$$

where $p_1$ equals the partial pressure of oxygen in said second reaction zone, $p_2$ equals the partial pressure of oxygen in said first reaction zone, $T_2$ is the maximum temperature in said first reaction zone expressed in Kelvin degrees and $T_1$ is the minimun temperature in said second reaction zone expressed in Kelvin degrees, (5) continuously withdrawing a stream of desorbed oxygen from the second reaction zone, and (6) continuously circulating the desorbed melt from the second reaction zone to said first reaction zone.

2. The process for the absorption of oxygen from a free oxygen containing gas which comprises, (1) continuously circulating in contact with a free oxygen containing gas at a temperature within the range of from 325° C. to 500° C. an oxygen absorbent mass consisting of metallic chlorides said chlorides consisting of a major proportion of cuprous chloride, a minor proportion of cupric chloride and an alkali metal chloride in an amount of from about 25 mole percent to about 45 mole percent of the total metallic chlorides as melting point depressant to maintain the metallic chlorides in the liquid state at the temperature of contact with said gas, (2) continuously separating the oxidized absorbent mass from contact with the gas, (3) circulating in continuous flow the oxidized absorbent mass from said first reaction zone to a second reaction zone, (4) continuously subjecting the oxidized mass in said second reaction zone to a temperature of from 425° C. to about 550° C. and at least 25° C. above the maximum temperature of the circulating mass in the first reaction zone, (5) continuously recovering oxygen desorbed from the oxidized mass in step 4, and (6) continuously circulating at least a part of the desorbed absorbent mass from step 4 to step 1 of the process.

3. A process for the production of oxygen from air which comprises contacting a circulating melt, consisting of a major proportion of cuprous chloride and minor proportions of cupric chloride and potassium chloride, the ratio of said potassium chloride to cupric chloride in said melt being within the range of from 1 mole to 2 moles per mole of cupric chloride, with air in a reaction zone, maintaining the temperature of said melt in said reaction zone within the range of from about 350° C. to about 425° C., continuously circulating the oxidized melt to and through a separate heating zone, desorbing oxygen from said melt therein at a temperature within the range of from 450° C. to 525° C. and continuously circulating oxygen depleted melt to the first mentioned reaction zone.

4. A process for the production of oxygen which comprises, (1) continuously contacting a circulating melt consisting of a major proportion of copper chlorides, a major proportion of which copper chlorides consists of cuprous chloride, at a temperature of from about 350° C. to about 400° C. with a free oxygen containing gas in a first reaction zone at a partial pressure of oxygen within the range of from about 0.2 atmosphere absolute to about 6.0 atmospheres absolute, the remaining component of said melt consisting of from about 25 moles to about 45 moles of potassium chloride per 100 moles of melt as a melting point depressant to maintain said chlorides in the liquid state at the temperature of contact with said gas and to improve the oxygen desorption properties of the oxidized melt, (2) continuously separating the oxidized copper chloride-potassium chloride melt from contact with the gas, (3) circulating in continuous flow the oxidized copper chloride-potassium chloride melt from said first reaction zone to and through a second reaction zone, (4) continuously subjecting the oxidized melt in said second reaction zone to a temperature of from about 425° C. to about 550° C. and to conditions of pressure such that desorption of oxygen will occur at a value of K of from 0.16 to 0.67 in the relationship $$p_1 = Kp_2 10^{-9540\left(\frac{T_2-T_1}{T_1 T_2}\right)}$$

wherein $p_1$ is equal to the partial pressure of oxygen in said second reaction zone, $p_2$ equals the partial pressure of oxygen in said first reaction zone, $T_2$ is the maximum temperature Kelvin in first reaction zone and $T_1$ is the minimum temperature Kelvin in said second reaction zone, (5) continuously recovering desorbed oxygen from step 4 of the process, and (6) continuously circulating desorbed melt from step 4 to step 1 of the process.

5. The process for the production of oxygen which comprises, (1) continuously contacting a molten mixture of cupric chloride, cuprous chloride and potassium chloride in which the amount of potassium chloride is from 20 to 50 mole percent and cuprous chloride is in excess of the cupric chloride with air at a temperature of from about 350° C. to about 425° C. in a first reaction zone, (2) continuously separating the oxidized mixture from contact with the gas, (3) circulating in continuous flow the oxidized mixture from said first reaction zone to and through a second reaction zone, (4) continuously subjecting the oxidized copper chloride-potassium chloride mixture to a temperature within the range of from about 450° C. to about 550° C., (5) continuously recovering the desorbed oxygen from said second reaction zone, and (6) continuously circulating the desorbed copper chloride-potassium chloride mixture to said first reaction zone.

6. The process for the production of oxygen which comprises: (1) continuously contacting cuprous chloride with air at a temperature within the range of from about 325° C. to about 500° C. at an oxygen partial pressure within the range of from 0.2 to 6.0 atmospheres absolute in a first reaction zone, said cuprous chloride being admixed with a minor amount of cupric chloride and from 25 to 45 mole percent of an alkali metal chloride based on 100 moles of the total chloride mixture to maintain said chloride mixture in the liquid state at the temperature of contact with said air, (2) continuously separating the oxidized chloride mixture from contact with the air, (3) transferring in continuous flow the oxidized chloride mixture from said first reaction zone to a second reaction zone, (4) continuously subjecting the oxidized chloride mixture in said second reaction to a temperature within the range of from about 425° C. to about 550° C. and correlating the conditions of temperature and pressure in said second reaction zone to the conditions of temperature and oxygen partial pressure employed in the first reaction zone so that the value of K will be between 0.16 and 0.67 in the equation $$p_1 = Kp_2 10^{-9540\left(\frac{T_2-T_1}{T_1 T_2}\right)}$$

where $p_1$ equals the partial pressure of oxygen in said second reaction zone, $T_2$ equals the maximum temperature Kelvin in said first reaction zone, $p_2$ equals the partial pressure of oxygen in the said first reaction zone and $T_1$ equals the minimum temperature Kelvin in said second reaction zone, (5) continuously recovering the desorbed oxygen from said second reaction zone and (6) continuously circulating the desorbed chloride mixture from said second reaction zone to said first reaction zone.

7. The process of claim 6 wherein the partial pressure of oxygen in the first reaction zone is no more than two atmospheres.

8. The process of claim 6 wherein the partial pressure of oxygen in the second reaction zone is at least one atmosphere.

9. The process for the production of oxygen which comprises, (1) continuously contacting a mixture of copper chlorides, said chlorides consisting of a major proportion of cuprous chloride and a minor proportion of cupric chloride at a temperature of from about 350° C. to about 425° C. with air in a first reaction zone at an oxygen partial pressure of from 0.2 to 6.0 atmospheres absolute, said copper chlorides being admixed with at least one alkali metal chloride in an amount within the range of from 20 mole percent to 50 mole percent of the total chlorides in the resulting mixture of copper chlorides and alkali metal chloride, (2) continuously separating the oxidized chloride mixture from contact with the air, (3) circulating in continuous flow the oxidized chloride mixture from said first reaction zone to and through a second reaction zone, (4) continuously subjecting said oxidized chloride mixture in said second reaction zone to a temperature within the range of from about 425° C. to about 550° C. and correlating the conditions of temperature and oxygen partial pressure in said second reaction zone with the conditions of temperature and oxygen partial pressure employed in the first reaction zone so that the value of K will be within the range of from 0.16 to 0.67 in the relationship $$p_1 = K p_2 10^{-9540 \left( \frac{T_2 - T_1}{T_1 T_2} \right)}$$

where $p_1$ equals the partial pressure of oxygen in said second reaction zone, $p_2$ equals the partial pressure of oxygen in said first reaction zone, $T_2$ equals the maximum temperature Kelvin in said first reaction zone and $T_1$ equals the minimum temperature Kelvin in the second reaction zone, (5) continuously recovering desorbed oxygen from the second reaction zone, and (6) continuously circulating the desorbed chloride mixture from step 4 to step 1 of the process.

10. A process for the extraction of oxygen from free oxygen containing gas which comprises circulating a salt mixture consisting of a major proportion of cuprous chloride and minor proportions of cupric chloride and potassium chloride through a reaction zone, maintaining the temperature of said salt mixture in said reaction zone within the range of from 325° C. to about 500° C., contacting the salt mixture in said reaction zone with a stream of free oxygen containing gas, circulating the partially oxidized mixture to a separate reaction zone, subjecting the mixture therein to a temperature within the range of from 425° C. to about 550° C., and at least 25° C. above the temperature in the first reaction zone, recovering the desorbed oxygen, and returning the salt mixture to the first reaction zone for recycling through the process.

11. A process for the production of oxygen which comprises contacting in a reaction zone a continuously circulating melt consisting of a major proportion of cuprous chloride and minor proportions of an alkali metal chloride and cupric chloride with a free oxygen containing gas at a temperature within the range of from about 350° C. to about 425° C. to form cupric oxychloride from at least a part of said cuprous chloride in said melt, continuously circulating said melt to a second reaction zone, thermally desorbing oxygen from said melt at a temperature of from about 450° C. to about 550° C. in said reaction zone to reform cuprous chloride in said melt, recovering desorbed oxygen and continuously circulating said melt from said second reaction zone to said first mentioned reaction zone.

EVERETT GORIN.

REFERENCES CITED

The following references are of record in the file of this patent:

UNITED STATES PATENTS

| Number | Name | Date |
|---|---|---|
| 73,450 | Mallet | Jan. 21, 1868 |
| 945,048 | Ridley | Jan. 4, 1910 |
| 1,091,023 | Larsen | Mar. 24, 1914 |
| 1,124,304 | Danckwardt | Jan. 12, 1915 |
| 1,984,380 | Odell | Dec. 18, 1934 |
| 2,299,427 | Rosenstein | Oct. 20, 1942 |
| 2,206,399 | Grosvenor | July 2, 1940 |
| 2,280,673 | Thomas | Apr. 21, 1942 |
| 2,304,827 | Jewell | Dec. 15, 1942 |

FOREIGN PATENTS

| Number | Country | Date |
|---|---|---|
| 2,934 | British | of 1865 |